US009860257B1

(12) United States Patent
Kumar et al.

(10) Patent No.: US 9,860,257 B1
(45) Date of Patent: Jan. 2, 2018

(54) ANOMALY DETECTION AND THREAT PREDICTION THROUGH COMBINED POWER AND NETWORK ANALYTICS

(71) Applicant: Cisco Technology, Inc., San Jose, CA (US)

(72) Inventors: Ashwin Kumar, Bengaluru (IN); Saravanan Radhakrishnan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/619,701

(22) Filed: Jun. 12, 2017

(51) Int. Cl.
*H04L 12/26* (2006.01)
*H04L 29/06* (2006.01)
*G06F 11/30* (2006.01)
*G06F 1/26* (2006.01)
*G06F 11/34* (2006.01)

(52) U.S. Cl.
CPC .......... *H04L 63/14* (2013.01); *G06F 11/3062* (2013.01); *H04L 43/16* (2013.01); *G06F 1/26* (2013.01); *G06F 11/34* (2013.01)

(58) Field of Classification Search
None
See application file for complete search history.

(56) References Cited

U.S. PATENT DOCUMENTS

| 6,541,878 | B1 | 4/2003 | Diab |
| 7,061,142 | B1 | 6/2006 | Marshall |
| 7,657,938 | B2 | 2/2010 | Palmer, Jr. et al. |
| 8,018,349 | B1 | 9/2011 | Getker et al. |
| 8,300,666 | B2 | 10/2012 | Karam et al. |
| 8,305,906 | B2 | 11/2012 | Karam |
| 8,543,247 | B2 | 9/2013 | Boss et al. |
| 9,240,997 | B1* | 1/2016 | Pearson ............... H04L 63/1416 |
| 2005/0257262 | A1 | 11/2005 | Matityahu et al. |

(Continued)

OTHER PUBLICATIONS

Larry Wakeman, AN-757 Measuring Ethernet Tap Capacitance, Mar. 1991, National Semiconductor Application Note 757, Texas Instruments, 6 pages.

(Continued)

*Primary Examiner* — Alex Skripnikov
(74) *Attorney, Agent, or Firm* — Edell, Shapiro & Finnan, LLC

(57) ABSTRACT

A network device communicates network traffic in one or more network flows via a plurality of ports. Each port is connected to a corresponding computing device. The network device collects flow-based network data associated with each corresponding computing device. The network device supplies electrical power to the corresponding computing devices via one or more of the ports, and collects power data associated with each corresponding computing device based on the electrical power supplied to each of the ports. The network device combines the flow-based network data for each corresponding computing device and the power data for each corresponding computer device to generate combined data associated with each corresponding computing device. The network device then exports the combined data for the corresponding computing devices to a security server, which detects anomalous behavior in the computing devices.

20 Claims, 5 Drawing Sheets

(56) References Cited

U.S. PATENT DOCUMENTS

| | | | | |
|---|---|---|---|---|
| 2008/0117909 | A1* | 5/2008 | Johnson | G06F 13/387 |
| | | | | 370/392 |
| 2016/0173511 | A1* | 6/2016 | Bratspiess | H04L 41/145 |
| | | | | 726/23 |
| 2016/0366162 | A1* | 12/2016 | Herzel | G01R 27/16 |

OTHER PUBLICATIONS

JP Vasseur. PhD, "Internet Behavioral Analytics (IBA) using Self Learning Networks", BRKSEC-3056, Cisco live!, Jun. 2015, San Diego, CA, pp. 1-30.

David McGrew, "Joy: an open source package for capturing and analyzing network flow and intraflow data", Jan. 12, 2016, https://www.linkedin.com/pulse/joy-open-source-package-capturing-analyzing-network-flow-david-mcgrew, 3 pages.

Shane S. Clark, et al., "WattsUpDoc: Power Side Channels to Nonintrusively Discover Untargeted Malware on Embedded Medical Devices", Published in the Proceedings of USENIX Workshop on Health Information Technologies, Aug. 2013, 11 pages.

"Cisco Catalyst 3850 Series Switches", The Digital Transformation: Converged Wired and Wireless Access and Aggregation, Data Sheet, Cisco, C78-720918-23, Feb. 2017, 36 pages.

Taylor Armerding, "How "Power fingerprint" could improve security for ICS/SCADA systems", Feb. 23, 2015, CSO, 4 pages.

John Toon, "Monitoring Side-Channel Signals Could Detect Malicious Software on IoT Devices", Aug. 1, 2016, Atlanta, GA, http:www.news.gatech.edu/2016/07/31/monitoring-side-channel-signals-could-detect-malicious-software-iot-devices, Georgia Tech News Center, 3 pages.

Paul Roberts, "Plug and Pray? Virta Labs Using Power Analytics to Spot IoT Compromises", Aug. 17, 2015, The Security Ledger, https://securityledger.com/2015/08/plug-and-pray-virta-labs-using-power-analysis-to-spot-iot-compromises/, 6 pages.

JP Vasseur. PhD, "Internet Behavioral Analytics (IBA) using Self Learning Networks", BRKSEC-3056, Cisco live!, Jun. 2015, San Diego, CA, pp. 31-60.

* cited by examiner

ANOMALY DETECTION AND THREAT PREDICTION THROUGH COMBINED POWER AND NETWORK ANALYTICS

TECHNICAL FIELD

The present disclosure relates to malware detection in computing devices.

BACKGROUND

Network elements, such as routers and switches, provide network connectivity for a wide range of computing devices. Malware on the endpoint computing devices may use the network connectivity provided by the connected network elements, e.g., to compromise information on the endpoint computing device or to direct Denial of Service attacks. In some distributed network monitoring systems, such as Network as a Sensor or Encrypted Traffic Analytics provided by Cisco Systems, Inc., the network elements report characteristics of the network traffic to a central security appliance. The central security appliance analyzes the network traffic characteristics to determine whether any particular network traffic includes anomalous traffic that may be indicative of malware.

DESCRIPTION OF EXAMPLE EMBODIMENTS

Overview

Figure 1:
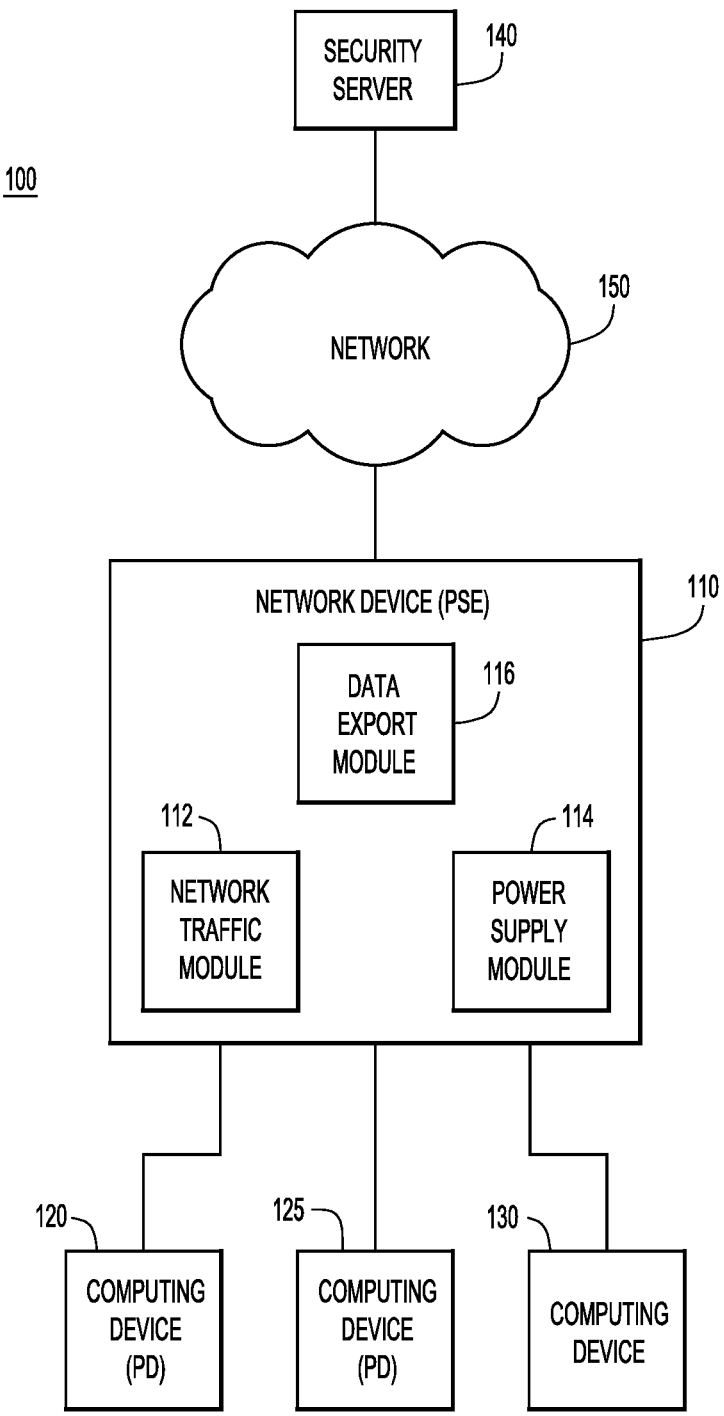
FIG. 1 is a system block diagram showing a monitoring system for combining information on network traffic with information on power usage, according to an example embodiment.

A computer-implemented method is provided comprising communicating network traffic in one or more network flows via a plurality of ports in a network device. Each of the plurality of ports is connected to a corresponding computing device. The method involves collecting flow-based network data associated with each corresponding computing device based on the network traffic communicated via each port. The network device supplies electrical power to the corresponding computing device via one or more of the plurality of ports, and collects power data associated with each corresponding computing device based on the electrical power supplied to each of the one or more ports. The network device combines the flow-based network data associated with each corresponding computing device and the power data associated with each corresponding computer device to generate combined data associated with each corresponding computing device. The network device then exports the combined data for one or more of the corresponding devices to a security server.

DETAILED DESCRIPTION

Networking devices are evolving from merely providing network connectivity to being a single point of attachment for many devices, providing power and network connectivity. In some categories of computing devices, the amount of power consumed strongly correlates with the amount of network traffic to and from the device. As a single point of attachment for some devices, such as Internet of Things (IoT) devices, the network device can monitor both network activity and power consumption for anomalous behavior. Relatively simple IoT devices may have strict power budgeting requirements that enable the network device to develop a power consumption profile that is quite accurate.

The techniques presented herein rely on the fact that in constrained resource systems, such as IoT devices, the patterns of network usage are limited and strongly correlated with the power requirements of the device. A network device that provides both power and network connectivity may be uniquely positioned to measure both of the attributes accurately, learn correlation patterns, and detect deviations/anomalies from the learned patterns.

Deviations from the power profile for a particular computing device may be caused, for example, by malware that requires the computing device to do more than its designed functionality leading to a different power consumption pattern. In another example, a simple malfunction or misconfiguration in the computing device may result in an altered power consumption pattern. Since the network device (e.g., a Power over Ethernet (PoE) device) may double as a Power Sourcing Equipment (PSE), the network device can accurately measure the amount of power that the computing device draws. In one example, the power consumption data may be streamed, for example as part of a Netflow record, to an upstream agent that may continuously profile the computing device to detect anomalies. The upstream agent may monitor the computing device for anomalies based on the combination of power consumption data and network traffic data.

Empirical data collected from endpoints shows that many IoT devices have elevated power consumption levels when affected by malware, such as a botnet malware, which may be used for launching Distributed Denial of Service (DDoS) attacks. While data traffic patterns from the IoT endpoints may be an initial indicator of an infection, power data acts as a supplemental detection mechanism, especially for malware that does not generate significant network activity. For instance, cryptoware/ransomware attacks may cause elevated power consumption due to the increased processor usage for encrypting the data, but would not add significant network traffic for analysis.

Referring now to FIG. 1, a simplified block diagram of an anomaly detection system 100 is shown. System 100 includes a network device 110 that includes a network traffic monitor 112, a power supply monitor 114, and a data export module 116. The network device 110 is configured to provide network connectivity and electrical power (e.g., as a PSE device) to computing devices 120 and 125, which may be PoE Powered Devices (PDs). The network device 110 may also provide network connectivity to a computing device 130 without providing electrical power. The network device 110 is connected to a security server 140 through a computer network 150.

The network traffic monitor 112 tracks the network data that passes through the network device 110 for each computing device 120, 125, or 130. In one example, the network traffic monitor 112 may generate flow-based statistics for each network traffic data flow for which one of the computing devices 120, 125, or 130 is an endpoint. The power supply monitor 114 monitors the electrical power supplied from the network device 110 to the computing device 120 and/or 125. The computing device 130 does not draw any electrical power from the network device 110, and the power supply monitor 114 is not able to directly monitor the power consumed by the computing device 130. In one example, the computing device 130 may provide power consumption data to the network device 110, which may combine the received power consumption data with network traffic data from the network traffic monitor 112. However, power consumption data received from the computing device 130 is inherently less trusted, since any malware present on the computing device 130 may be configured to mask the power consumption data with inaccurate data.

The data export module 116 in the network device 110 combines the network traffic data for each computing device 120, 125, and 130 with any power consumption data available for each respective computing device. In one example, the data export module 116 generates a Netflow or other similar flow monitoring record with data from the network traffic monitor 112 and adds power consumption data from the power supply monitor 114 as additional metadata for the Netflow or other similar record. The security server 140 receives the combined power and network data and profiles the combined power and network traffic patterns to detect anomalous operations in the computing devices, which may be caused by unauthorized processes/malware.

In one example, the network device 110 monitors power consumption at a per port level in real-time for power budgeting purposes. Security features (e.g., network traffic monitor 112) in the network device 110 may use Netflow to stream flows of interest to security agents (e.g., security server 140) that is provided in the network 150. The combined data exporter 116 of the network device 110 streams power consumption data and anomaly metrics along with every flow being sent to the central agent on the security server 140. This enables a central agent on the security server 140 to continuously profile and correlate both power and data traffic patterns of an endpoint, such as computing device 120. The security server 140 may develop models for anomalous behavior that consider both power consumption and network traffic data.

In another example, the computing device 120 and 125 may be relatively simple IoT devices that rely on the network device 110 for both power and network connectivity. Alternatively, the computing devices 120 and 125 may be a more generic class of computing device, such as a laptop computer. For instance, a PoE-powered laptop charging interface may allow a general purpose processing device (e.g., a laptop computer) to be powered by the same PoE PSE device that provides network connectivity to the laptop computer. While power consumption patterns of general purpose computing devices may be more complex to profile, over a long enough period of time sufficient power data may be gathered to generate power profiles for general purpose computers. The power data may then be used as a complementary signal for typical anti-malware software based on monitoring only network traffic signals.

Figure 2:
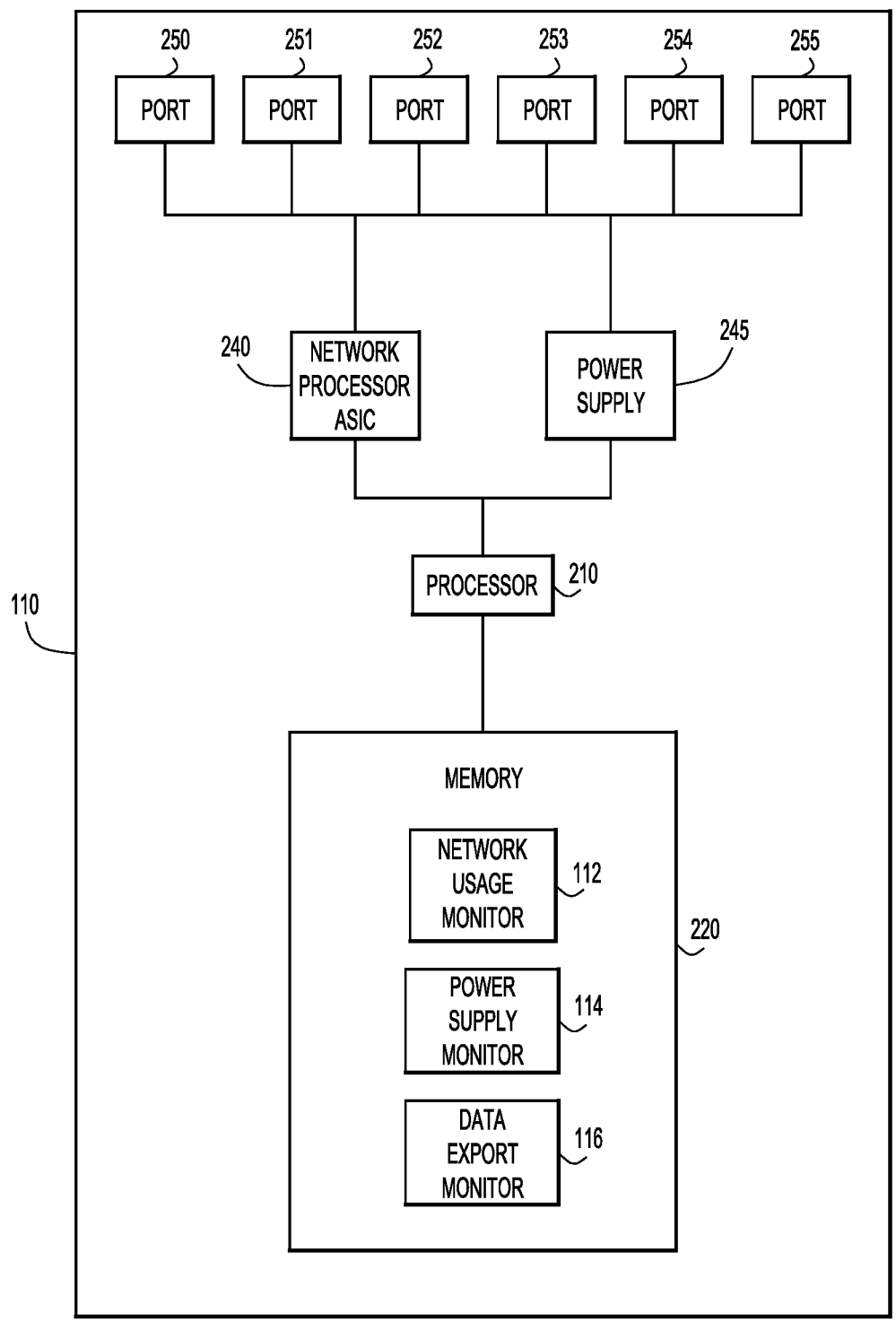
FIG. 2 is a simplified block diagram of a network device configured to perform monitoring operations according to an example embodiment.

Referring now to FIG. 2, a simplified block diagram of network device 110 is shown. The network device 110 includes, among other possible components, a processor 210 to process instructions relevant to processing communication packets, and memory 220 to store a variety of data and software instructions for the network traffic monitor 112, power supply monitor 114, data export module 116. The network device 110 also includes a network processor application specific integrated circuit (ASIC) 240 to process communication packets that flow through the network device 110. The network device 110 further includes a power supply 245 that can supply electrical power to computing devices connected to the network device 110. Network processor ASIC 240 processes packets to and from ports 250, 251, 252, 253, 254, and 255. Power supply 245 may provide power to ports 250, 251, 252, 253, 254, and/or 255. While only six ports are shown in this example, any number of ports may be included in network device 110.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
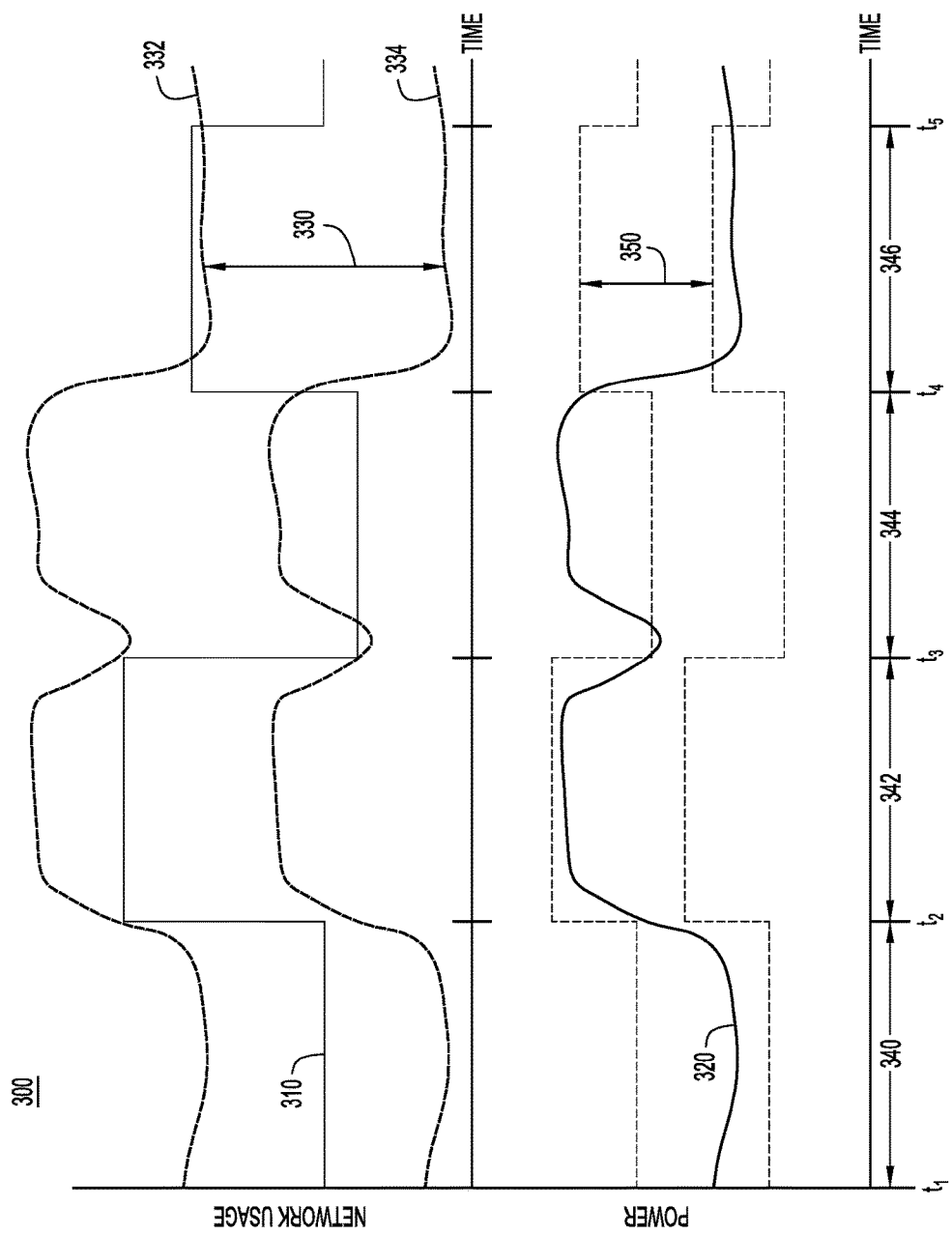
FIG. 3 is a graph illustrating changing a threshold for detecting anomalous network usage/power consumption based on power consumption/network usage information, according to an example embodiment.

Referring now to FIG. 3, a graph 300 illustrates a simple algorithm that may be used by the security server 140 to generate a threshold in detecting anomalous network usage behavior based on power consumption data, and vice versa. The graph 300 plots the network usage data 310 and power consumption data 320 for a particular computing device as a function of time. A network usage threshold (range) 330 is shown to indicate expected network usage based on the measured power data 320. The graph 300 displays the network usage data in the upper half and the power consumption data in the lower half to better illustrate the correlation between the network usage threshold 330 and the power data 320.

The network usage threshold 330 determines whether the network usage 310 at any given time is indicative of anomalous behavior. Since a computing device is expected to use more power when the computing device is sending/receiving network traffic, the threshold 330 varies in proportion to the power supplied to the computing device. If the measured network usage 310 falls outside of the network usage threshold 330, then the security server 140 may flag the computing device as potentially infected with malware.

In one example, the security server 140 may set various parameters of the threshold 330 to fine tune the algorithm. For instance, the separation between the upper bound 332 and the lower bound 334 may be varied to account for the accuracy of the power consumption data or the variability in power requirement of sending or receiving different types of network traffic. Additionally, the security server 140 may adjust the lower bound 334 to account for a baseline level of power that is not related to network activity.

In the example illustrated by the graph 300, the network usage 310 for the computing device is shown for arbitrary time periods 340, 342, 344, and 346 between time points $t_1$, $t_2$, $t_3$, $t_4$, and $t_5$, respectively. The network usage 310 begins in time period 340 at a relatively low level, and the power consumption data 320 is also measured at a relatively low level. Since the measured network usage 310 is within the threshold 330 during the time period 340, the security server does not detect any anomalous behavior. In time period 342, the network usage 310 increases and the power consumption data 320 reflects a similar increase. Since the power consumption data 320 increases, the network usage threshold 330 also increases, and the measured network usage 310 remains within the network usage threshold 330.

In the time period 344, the network usage 310 drops to a relatively low level, but the power consumption data 320 returns to a relatively high level. With a relatively high power consumption data 320, the network usage threshold 330 remains high and the measured network usage 310 falls below the lower bound 334. The security server 140 detects that the network usage 310 is outside of the threshold 330 and flags the computing device for anomalous behavior. In one example, the security server 140 may allow minor excursions beyond the threshold value, and only flag anomalous behavior that persists for a minimum amount of time. In another example, the network usage 310 may be determined to be anomalous if it falls outside the network usage threshold 320 for a predetermined amount of time (e.g., 75% of the time period 344).

In the time period 346, the network usage 310 increases again to a relatively high level, but the power consumption data 320 drops to a relatively low level. With a relatively low power consumption data 320, the network usage threshold 330 also drops to a relatively low level and the measured network usage 310 falls above the upper bound 332. The security server 140 detects that the network usage 310 is outside of the threshold 330 and flags the computing device for anomalous behavior.

In one example the security server 140 may further classify the type of anomalous behavior to better classify the potential malware threat. For instance, during the time period 344, the security server 140 may detect that the network usage 310 is higher than the power data 320 would typically indicate, and flag the anomalous behavior as potentially caused by an encryption-based malware, such as ransomware. In other words, the security server 140 may detect the unexplained additional power consumption and infer that the computing device is drawing additional power for an unusually processor-intensive operation, such as encryption.

As another example, during time period 346, the security server 140 may detect the relatively high network usage for the relatively low power consumption and infer that the computing device is not fully processing the network data. This may be a sign that the computing device is participating in a DDoS attack by sending multiple identical network messages that do not need to be individually processed by the computing device. Alternatively, a low power consumption 320 relative to the network usage 310 may indicate that the computing device is misconfigured to ignore packets that it would normally process.

The algorithm illustrated by graph 300 has been described with respect to comparing network usage 310 with the threshold 330, which is based on the measured power data 320. However, a similar algorithm may be implemented by comparing the power consumption data 320 with a power threshold (range) 350, which is based on the measured network usage 310.

Figure 4:
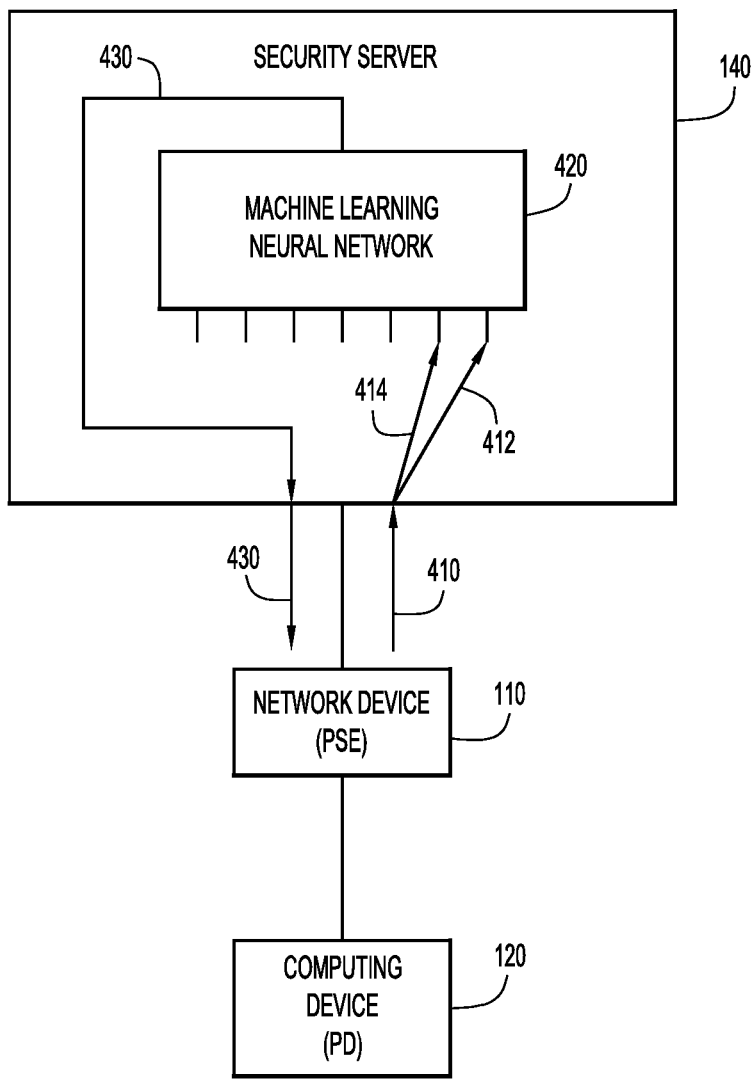
FIG. 4 is a simplified system diagram illustrating a machine learning algorithm that detects malware based on the combination of power and network data, according to an example embodiment.

Referring now to FIG. 4, a simplified block diagram illustrates a machine learning algorithm that uses the combined network usage data and power consumption data to detect anomalous behavior. The network device 110 provides network connectivity and electrical power (e.g., as a PSE device) to the computing device 120 (e.g., a Powered Device). The network device 110 monitors the network usage of the computing device 120 and the power supplied to the computing device 120, and sends the combined data 410 to the security server 140. The security server 140 uses the network usage data 412 and the power consumption data 414 as an input parameter for a machine learning module 420. In one example, the machine learning module may include a neural network. The machine learning module 420 may also include other input parameters, such as the type of device or exemplar data for malware infections.

Based on the input parameters, including the correlated network usage data 412 and the electrical consumption data 414, the machine learning module 420 provides a determination 430 of whether the input data suggests the computing device 120 is displaying anomalous behavior. The determination 430 may be provided to the network device 110, which may act on the determination 430 to further investigate or isolate the computing device 120. Additionally, the determination 430 may be used to update stored templates of specific anomalous behavior (e.g., malware). In one example, the determination 430 may indicate that the computing device 120 is infected with malware. Alternatively, the determination 430 may indicate that the computing device 120 is misconfigured, and suggest a best practice configuration for the computing device 120.

In another example, the machine learning module combines power measurements in the electrical consumption data 414 with other network-related analytics (e.g., flow rate, inter-packet timing, etc.) in the network usage data 412 to derive an understanding of the combined power and network domain. For instance, the power data may be added to a network monitoring tool that learns behaviors and flags deviations. Alternatively, the power data may provide further insight for security systems that match network analytics against malware signatures to detect anomalies and augment the capability of the security systems.

In a further example, the network device 110 associates the power data with a network flow as metadata in a Netflow record. The network device 110 exports the combined power and network data a single Netflow record. The addition of power data to Netflow records allows seamless integration of power domain data into centralized security systems that already gather Netflow records. Broadly speaking, having power consumption data as part of a Netflow record will allow easy access to power domain data for any analytics engines that rely on Netflow to map network behavior. This removes the need to maintain a separate Simple Network Management Protocol (SNMP) Management Information Base (MIB) or other form of network device programmability and querying mechanism to obtain the power data. The push mechanism of Netflow provides a simpler integration than the pull mechanism of an SNMP MIB.

In still another example, the network device 110 uses supervised learning to solve two classes of problems. Initially, the network device 110 uses machine learning to learn patterns in power and data to classify the type of computing device 120, e.g., a specific IP phone model. Once the computing device 120 is classified, the network device 110 uses machine learning to learn patterns in power and data to detect different behaviors of the computing device 120. For instance, the network device 110 may detect a specific correlation between power and network usage when a particular IP phone model places a call or connects to a call manager. Once patterns for classifying devices and its behaviors are learned as part of the initial training, portal machine learning models may be generated. These machine learning models may be deployed on the network device 110 or on the separate security server 140. The portable machine learning models may perform real-time classification and anomaly detection.

The initial training system may be implemented as a Linear Support Vector Machine (SVM) classifier. The system monitors several power and network data parameters and develops machine learning models to detect correlations and patterns between the power and network data parameters. Some of the power and network data parameters may include: power (e.g., measured in milliamps), peak power usage, average power usage, baseline power requirements, network volume (e.g., measured in bytes), network protocol(s) used, average packet size, and/or burst rate. The initial learning phase will create two type of portable models. The first model detect patterns to classify the type of device. The second model identifies behaviors (and detects anomalies) in classified devices. Each of these portable models may be deployed either on the network device 110 or the central security server 140.

During the initial training, test device(s) may be connected to a network switch that provides power and network connectivity to the test device(s). The network switch measures, for example, actual power usage, metadata related to power (e.g., average power, peak power, etc.), raw network data (e.g., number of packets), and network metadata (e.g., peak rate, average rate, protocols used, DNS queries, etc.). The measured power and network data may be packaged and sent to a central server where a machine learning and classification engine detects patterns in the network/power data. Since the initial training is a supervised learning algorithm, a human supervisor may manually label some or all of the learned patterns. Once the patterns are learned and labeled, a portable machine learning classification model is generated.

After the initial training, the portable machine learning models may be implemented as unsupervised models in a network switch or a central security server. Real-time classification requires significant processing power, and high end network devices may have sufficient spare processing power to deploy the classification models. This enables a real-time classification engine on the network device to quickly detect anomalies. Lower end network elements may be deployed with less processing resources to spare, and these network elements may export the data to a central security server (e.g., via Nedlow records) for near real-time classification and detection of anomalies.

Figure 5:
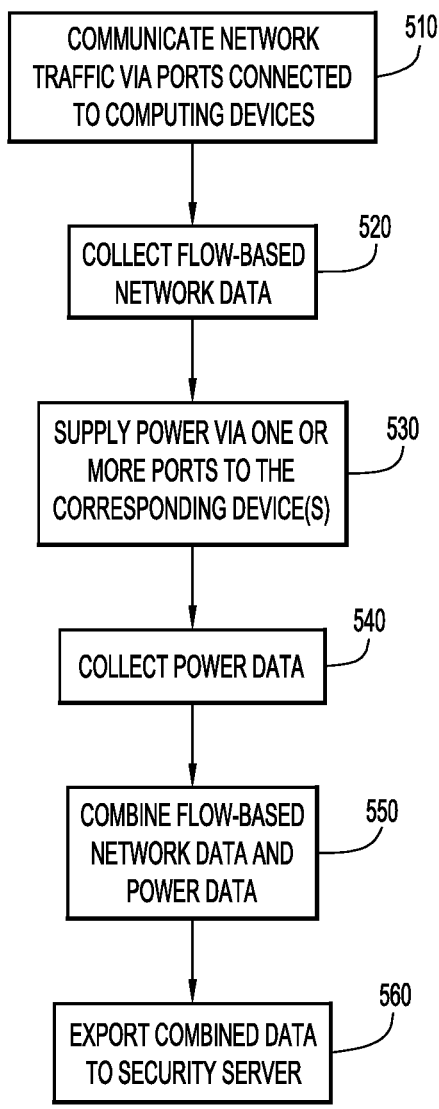
FIG. 5 is a flowchart showing operations of a network device to export combined power and network usage data, according to an example embodiment.

Referring now to FIG. 5, a flow chart is shown for a process 500 of operations performed by a network device to provide combined power and network data of a computing device to a security server, which may detect anomalous behavior in the computer device. In step 510 the network device communicates network traffic in one or more network flows via a plurality of ports. Each port in the plurality of ports is connected to a corresponding computing device. In step 520, the network device collects flow-based network data associated with each corresponding computing device based on the network traffic communicated via each port. In one example, the flow-based network data includes a measure of the network usage for packets in flows with the corresponding computing device as an endpoint.

In step 530, the network device supplies electrical power via one or more of the plurality of ports to the corresponding computer device. In one example, the network device supplies electrical power according to a PoE standard. The network device may supply electrical power via some or all of the plurality of ports in the network device. In step 540, the network device collects power data associated with each corresponding device based on the electrical power supplied to each of the one or more ports. In one example, the network device may also receive power consumption data from a corresponding computing device via the network data communicated with the computing device.

In step 550, the network device combines the flow-based network data associated with each corresponding computing device and the power data associated with each corresponding computing device to generate combined data for each corresponding computing device. In one example, the network device may perform some preliminary analysis on the network data and/or the power data before generating the combined data. For instance, power data may be referenced to models of typical or anomalous behavior and the difference between the models and the measured power data may be used in the combined data. In step 560, the network device exports the combined data for one or more of the corresponding computing devices to a security server. In one example, the security server may analyze the combined data to detect anomalous behavior in each corresponding computing device. The security server may provide an indication of whether each corresponding computing device displays anomalous behavior to the network device or an administrative client in charge of the computing devices and/or network device.

In summary, network devices play the dual role of providing both electrical power and network connectivity for many classes of devices, such as cameras, industrials controllers, and in the future laptop computers. Many of these PoE powered devices are low power IoT devices having a fixed power budget and generally consume power in a well-defined manner. The PoE network device maintains a close watch on the power consumption for budgeting purposes. In parallel, network flows may be exported to central security monitoring tools to learn behaviors and flag anomalies and threats. The techniques presented herein combine these two mechanisms and stream the combined power and network data on a per-flow/per-port basis and enables security applications to learn and flag anomalies by correlating patterns in both the power domain and the network domain.

One advantage in profiling power consumption from the network device is that no agent is required on the endpoint computing device in order to implement this security model. This may be useful to provide security on IoT device where installing an agent on the IoT firmware may be difficult. Additionally, relatively minimal changes are required on the network device, since power measurement is already an implemented function for PoE control. The network device can learn the power consumption patterns is local enforcement of policies is desired, or directly export the raw combined data for implementations with a central learning platform. Further, the techniques presented herein function even if malware on the computing device does not cause a variation in the network traffic pattern. For instance, malware may infect a network connected camera and launch a DDoS on the video streaming server to which the camera is sending network traffic. This would not cause any new traffic destinations to trigger network usage pattern alerts, but the combined power and network pattern may be sufficient to trigger a malware alert.

In one example, the techniques presented herein provide for a computer-implemented method comprising communicating network traffic in one or more network flows via a plurality of ports in a network device. Each of the plurality of ports is connected to a corresponding computing device. The method also comprises collecting flow-based network data associated with each corresponding computing device based on the network traffic communicated via each port. The network device supplies electrical power to the corresponding computing device via one or more of the plurality of ports, and collects power data associated with each corresponding computing device based on the electrical power supplied to each of the one or more ports. The network device combines the flow-based network data associated with each corresponding computing device and the power data associated with each corresponding computer device to generate combined data associated with each corresponding computing device. The network device then exports the combined data for one or more of the corresponding computing devices to a security server.

In another example, the techniques presented herein provide for an apparatus comprising a plurality of ports, a network interface unit, a power supply unit, and a processor. Each of the plurality of ports is connected to a corresponding device. The network interface unit is configured to communicate network traffic in one or more network flows via each port with the corresponding computing device. The network interface unit is also configured to collect flow-based network data associated with each corresponding computing device based on the network traffic communicated via each port. The power supply unit is configured to supply electrical power via one or more port of the plurality of ports to the corresponding computing device. The power supply unit is also configured to collect power data associated with each corresponding computing device based on the electrical power supplied to each of the one or more ports. The processor is configured to combine the flow-based network data associated with each corresponding computing device and the power data associated with each corresponding computing device to generate combined data associated with each corresponding computing device. The processor is also configured to export the combined data for one or more of the corresponding computing devices to a security server.

In a further example, the techniques presented herein provide for a system comprising a network device and a security server. The network device comprises a plurality of ports, and each port is connected to a corresponding computing device. The network device is configured to communicate network traffic in one or more network flows via each port with the corresponding computing device. The network device is also configured to collect flow-based network data associated with each corresponding computing device based on the network traffic communicated via each port. The network device supplies electrical power via one or more port of the plurality of ports to the corresponding computing device, and collects power data associated with each corresponding computing device based on the electrical power supplied to each of the one or more ports. The network device is configured to combine the flow-based network data associated with each corresponding computing device and the power data associated with each corresponding computing device to generate combined data associated with each corresponding computing device. The security server is configured to receive the combined data for the one or more corresponding computing devices. Based on the combined data, the security server detects whether each of the one or more corresponding devices is running an unauthorized process.

The above description is intended by way of example only. Various modifications and structural changes may be made therein without departing from the scope of the concepts described herein and within the scope and range of equivalents of the claims.

What is claimed is:

1. A method comprising:
   communicating network traffic in one or more network flows via a plurality of ports, wherein each port is connected to a corresponding computing device;
   collecting flow-based network data associated with each corresponding computing device based on the network traffic communicated via each port;
   supplying electrical power via one or more of the plurality of ports to the corresponding computing device;
   collecting power data associated with each corresponding computing device based on the electrical power supplied to each of the one or more ports;
   combining the flow-based network data associated with each corresponding computing device and the power data associated with each corresponding computing device to generate combined data associated with each corresponding computing device; and
   exporting the combined data for one or more of the corresponding computing devices to a security server.

2. The method of claim 1, wherein combining the flow-based network data and the power data comprises adding the power data as metadata of a standardized record of the flow-based network data.

3. The method of claim 1, wherein the power data comprises per-port power consumption data.

4. The method of claim 1, further comprising analyzing the flow-based network data and/or the power data for anomalies before generating the combined data.

5. The method of claim 1, further comprising detecting whether each of the one or more corresponding computing devices is running an unauthorized process based on the combined data.

6. The method of claim 5, wherein detecting comprises comparing the combined data with stored templates of power data and flow-based network data associated with malware processes.

7. The method of claim 6, further comprising updating the stored templates based on a machine learning process.

8. The method of claim 1, further comprising adjusting a threshold for detecting anomalous network traffic based on the power data.

9. The method of claim 1, further comprising adjusting a threshold for detecting anomalous electrical power consumption based on the flow-based network data.

10. An apparatus comprising:
    a plurality of ports, wherein each port is connected to a corresponding computing device;
    a network interface unit configured to:
       communicate network traffic in one or more network flows via each port with the corresponding computing device; and
       collect flow-based network data associated with each corresponding computing device based on the network traffic communicated via each port;
    a power supply unit configured to:
       supply electrical power via one or more port of the plurality of ports to the corresponding computing device; and
       collect power data associated with each corresponding computing device based on the electrical power supplied to each of the one or more ports; and
    a processor configured to:
       combine the flow-based network data associated with each corresponding computing device and the power data associated with each corresponding computing device to generate combined data associated with each corresponding computing device; and export the combined data for one or more of the corresponding computing devices to a security server.

11. The apparatus of claim 10, wherein the processor is configured to combine the flow-based network data and the power data by adding the power data as metadata of a standardized record of the flow-based network data.

12. The apparatus of claim 10, wherein the power supply unit is configured to collect the power data as per-port power consumption data.

13. The apparatus of claim 10, wherein the processor is further configured to analyze the flow-based network data and/or the power data for anomalies before generating the combined data.

14. A system comprising:
a network device comprising a plurality of ports, each port connected to a corresponding computing device, wherein the network device is configured to:
communicate network traffic in one or more network flows via each port with the corresponding computing device;
collect flow-based network data associated with each corresponding computing device based on the network traffic communicated via each port;
supply electrical power via one or more port of the plurality of ports to the corresponding computing device;
collect power data associated with each corresponding computing device based on the electrical power supplied to each of the one or more ports; and
combine the flow-based network data associated with each corresponding computing device and the power data associated with each corresponding computing device to generate combined data associated with each corresponding computing device; and
a security server configured to:
receive the combined data for the one or more corresponding computing devices; and
based on the combined data, detect whether each of the one or more corresponding computing devices is running an unauthorized process.

15. The system of claim 14, wherein the network device is configured to combine the flow-based network data and the power data by adding the power data as metadata of a standardized record of the flow-based network data.

16. The system of claim 14, wherein network device is configured to collect the power data as per-port power consumption data.

17. The system of claim 14, wherein the network device is further configured to analyze the flow-based network data and/or the power data for anomalies before generating the combined data.

18. The system of claim 14, wherein the security server is configured to detect whether each of the one or more corresponding computing device is running the unauthorized process by comparing the combined data with stored templates of power data and flow-based network data associated with malware processes.

19. The system of claim 18, wherein the security server is further configured to update the stored templates based on a machine learning process.

20. The system of claim 14, wherein the security server is further configured to adjust a threshold for detecting anomalous network traffic based on the power data.

* * * * *